United States Patent Office 2,730,894
Patented Jan. 17, 1956

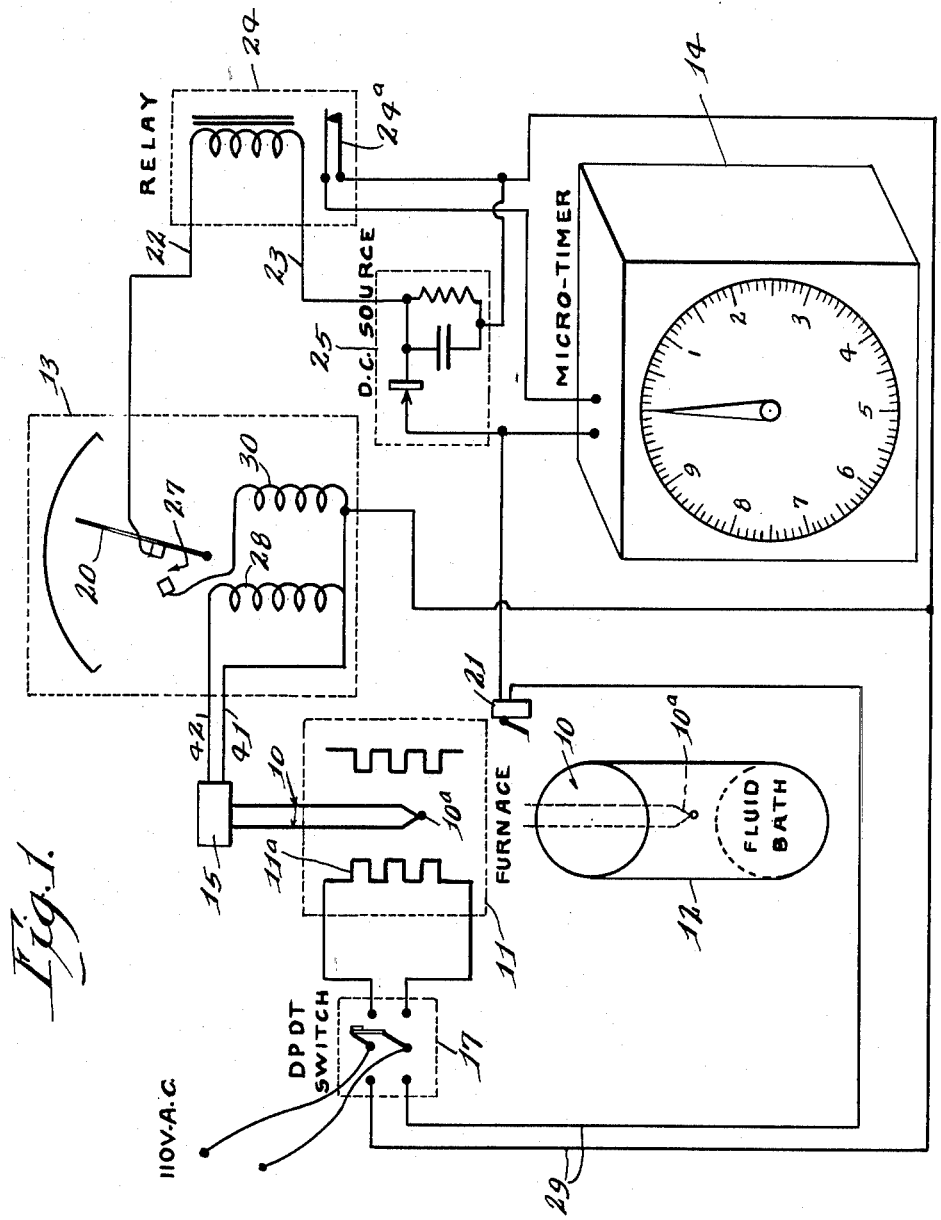

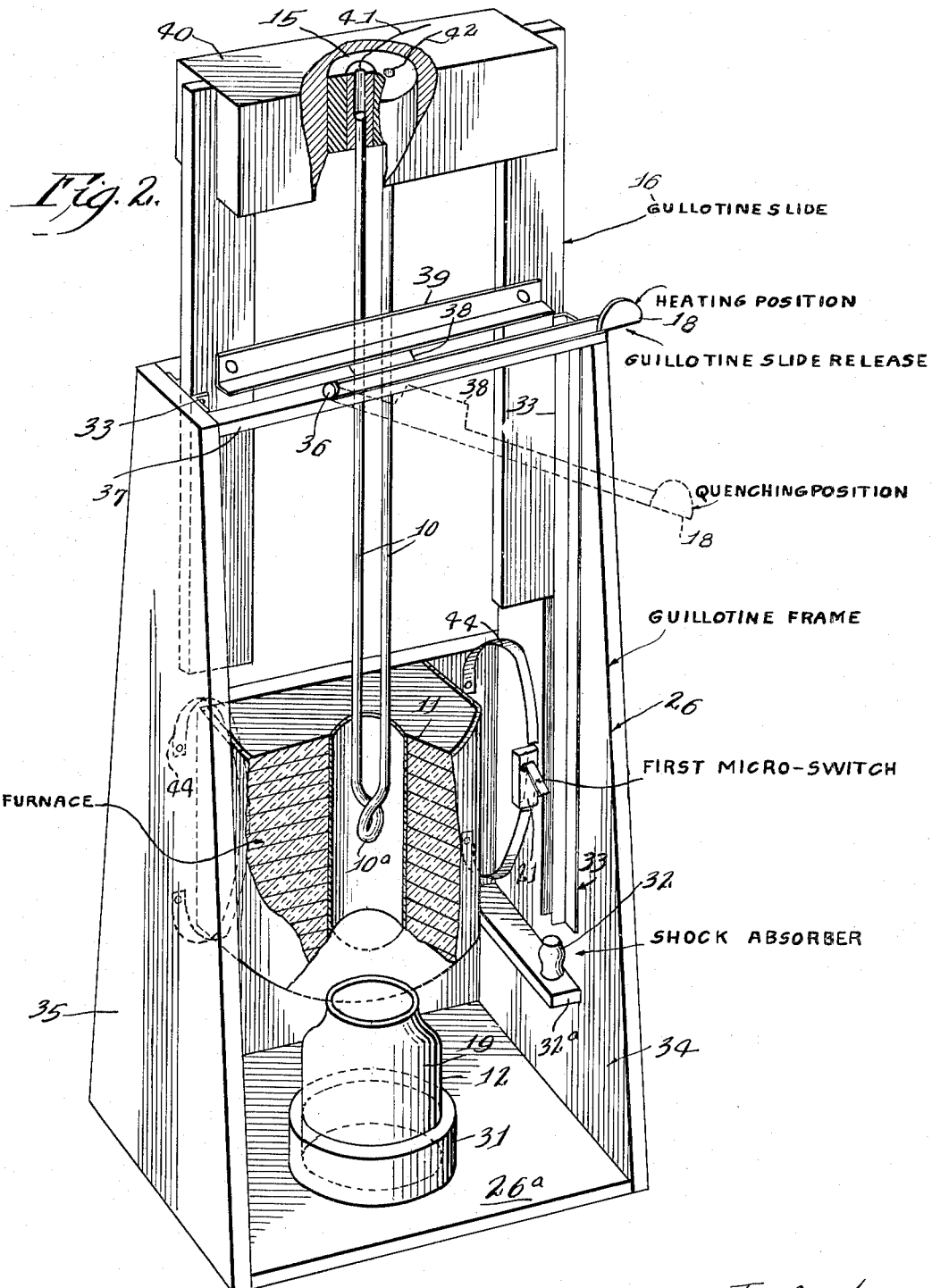

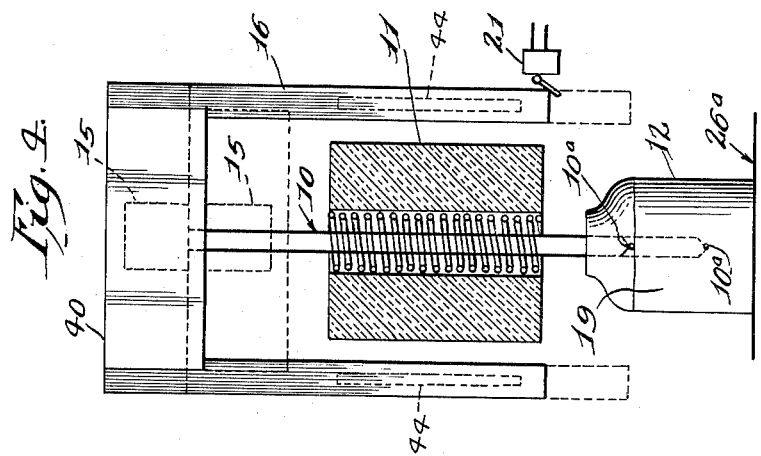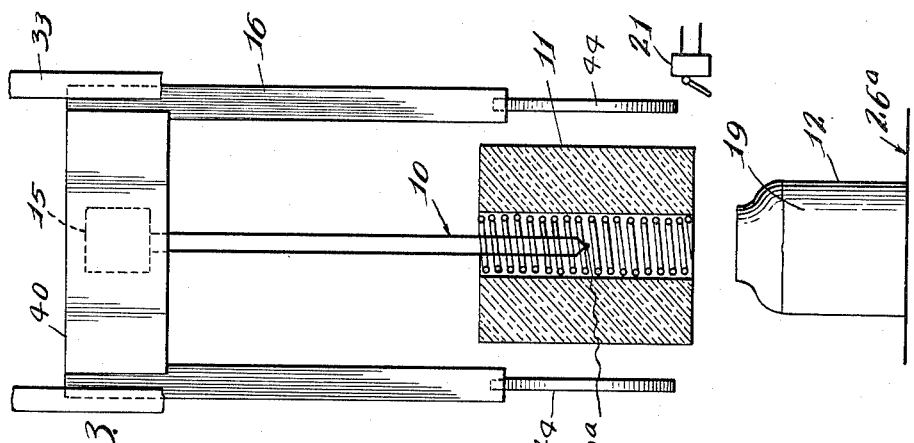

2,730,894

PORTABLE QUENCH OIL TESTER

Howard W. Husa, Chicago, Ill., assignor to Standard Oil Company, Chicago, Ill., a corporation of Indiana Application November 30, 1953, Serial No. 395,208

8 Claims. (Cl. 73—53)

This invention relates to an apparatus for evaluating the quenching power of quenching fluids.

Heretofore, the evaluation of the quenching power of fluids has involved tests wherein a steel specimen is heated to austenitizing temperature, quenched in a fluid, machined and then either etched or hardness readings taken, or both. Such methods are tedious, expensive and require expert interpretation. Furthermore, the apparatus is expensive and is not portable in the ready sense of the word. Likewise, such tests fail to give a temperature-time record of an object cooling in the fluid.

Accordingly, it is an important object of this invention to provide a quench oil tester which is accurate, inexpensive and portable. A further object is to provide an apparatus which gives indications of the value of a quenching fluid that can be readily interpreted by a lay audience and can be demonstrated before large as well as small groups. An additional object is to provide a demonstration method and apparatus which is simple, reproducible and rapid.

The need for a device which would evaluate the quenching power of a fluid with a minimum of effort and in a minimum time has been felt for some time. To make such an evaluation, it is desirable to produce a record of the fluid's ability to cool at a particular temperature (instantaneous cooling rate) and to obtain a visual record which may be compared with the record of a reference quenching oil so as to give an index of the oil's quenching power and of its desirability for different types of quenching work. Such evaluation work enables one to make recommendations with regard to the compounding of quenching oils, to make routine product control tests, and to evaluate operational difficulties where quenching oils are in actual use. It is accordingly an object of my invention to obtain a visual indication for a fluid under test which may be readily and quickly compared with a record of a reference quench oil.

It is a further object of my invention to provide a system which will evaluate a quenching oil in an economical, convincing, convenient and spectacular manner without requiring any substantial skill in the operation.

If a thermocouple bead were placed in a steel specimen, the thermocouple would measure the temperature of the specimen mass and would be affected by the chemical make-up of the specimen. For example, a steel specimen cooling from the austenite range transforms to pearlite or to martensite, depending upon its chemical composition and its rate of cooling. Chemical heat is released in this phase transformation and, accordingly, a thermocouple in the metallic mass would be influenced by the phase change to give an erroneous indication of the cooling phenomenon transpiring at the specimen surface. To add to the confusion, the heat liberated depends upon the completeness of the transformation which is different for different starting temperatures and different for different cooling rates. This is a serious limitation in view of the fact that the majority of the commercial work is done at temperatures in a range of 25 to 50° F. above the transformation temperature. It is, therefore, an important object of my invention to provide a system which does not require the heating and cooling of a substantial mass of metal.

A further object is to provide an apparatus which is compact, portable, and adaptable for testing quenching oil in the field. The foregoing and additional objects of my invention will become apparent to those skilled in the art as the description thereof proceeds.

Briefly, my portable fluid quenching tester embodies a movable thermocouple means, the bead of which is heated in a furnace to the quench temperature, i. e., the temperature from which the specimen is to be quenched. When a sliding support for the thermocouple is released, the heated bead is immersed in a body of quenching fluid and a switch means is tripped by the movement of the thermocouple holder.

Only a very small amount of fluid is necessary for testing purposes, a five ounce sample being sufficient for evaluation according to my invention. The results on these small samples have been correlated with results on larger samples. However, to avoid any excessive rise in the quenching fluid temperature during the quenching test, it is recommended that the sample be larger than about 50 ml. and preferably about 125 ml.

The thermocouple bead is suspended within the furnace by means of the sliding holder which may be an inverted U-shaped support. The arms of the inverted U are constrained to travel in a substantially vertical path. When the bead of the thermocouple is at the selected quenching temperature within the furnace, the sliding support is released thereby permitting the support and thermocouple means to slide as a unit under the influence of gravity. This action removes the thermocouple bead from the furnace and immerses it in the fluid sample. When this occurs, the first switch is closed and the timer begins to operate. A current indicator means indicates the temperature of the thermocouple bead and a second switch responsive to the current indicator is closed by the movement of the indicator needle down-scale. The complete operation of this apparatus may, therefore, be summarized as follows.

A release for the sliding holder is operated manually and has two positions. In its first position, it holds the slide aloft and positions the thermocouple bead within the furnace for heating. In its second position, the release is pulled away from the frame thus permitting the sliding holder to drop and to carry with it the thermocouple bead from the furnace into the test fluid disposed below. The sliding holder closes the first switch which starts the timer. The thermocouple bead is cooled by the oil bath and its temperature decreases. At a preselected lower temperature level, contacts of the second switch are closed and the timer is automatically stopped. The apparatus has thereby accurately measured the time required for the thermocouple bead to cool from a selected temperature to some designated lower temperature.

Further details of my invention will be described in connection with the accompanying drawings wherein:

Figure 1 is a schematic view of the wiring diagram;

Figure 2 is a perspective, partly in section, of one embodiment of the apparatus incorporating features of my invention; and Figures 3 and 4 illustrate positions of the guillotine slide, thermocouple, furnace and quenching oil sample holder.

Referring to the drawings, the principal points of the apparatus are a pyrometer means including thermocouple 10, an electric furnace 11, a sample container 12, a current indicator means 13 having a predetermined low limit contact 27 and an electric timer 14. The thermocouple 10 is supported by the thermocouple connector 15 which is supported by the guillotine slide 16. The thermocouple 10 is heated to quenching temperature in the electric furnace 11 which is preferably cylindrical, open at both ends and mounted so that its axis is substantially vertical.

When the desired temperature of the thermocouple 10 is indicated on the indicator 13, the position of switch 17 is changed (to de-energize the furnace windings 11a and make power available to the measuring circuit) and the thermocouple 10 is mechanically released by the slide release 18 to fall through the furnace 11 into the quenching fluid 19 within the sample container 12. When the thermocouple 10 enters the fluid 19 in container 12, the guillotine slide 16 trips the micro-switch 21 to energize an electric timer 14 and D. C. power supply 25.

In cooling from the initial quenching temperature, the thermocouple temperature indicator hand 20 travels down-scale to close the low limit switch 27 having one contact thereof carried by the indicator hand 20. This switch 27 is built into the indicator means 13 and may be manually set to close at any desired temperature. The closing of the switch 27 energizes relay 24 (via leads 22 and 23 and D. C. power source 25) which stops electric timer 14 by opening relay contacts 24a. In this manner, the cooling time from any desired initial temperature to any desired final temperature may be accurately measured. The length of the free fall path of the thermocouple 10 and the time spent in free fall are not critical so long as the thermocouple bead 10a has not dropped below the temperature from which quenching is to initiate by the time it reaches the fluid surface.

The thermocouple 10 and the slide 16 move in a guillotine frame 26 or some other mechanical slide device which holds the thermocouple 10 in the furnace 11 during the heating of the thermocouple 10 and yet permits it to drop through the heater 11 to a fluid bath 19 when released.

The furnace 11 may be a light weight, rapid heating, electric furnace. It is preferably not a continuous duty furnace, but one that is turned on and off for each quenching test. The thermocouple 10 is brought up to temperature in less than one minute after the initial test (which requires about three minutes of heat-up time).

The use of a bare thermocouple of the furnace type assures the operator that the temperature-time phenomenon is characteristic of the oil under test.

The choice of initial or quench temperature and of end temperature are entirely up to the operator, but there are several practical considerations which make some temperatures more desirable than others. For good heater life, the coils should not be heated above 2000° F. for extended periods of time. Yet, the temperature should be high enough to be the austenitizing range for most steels. A typical temperature, and one that can be correlated with industrial quenching work, is 1600° F.

A brief description of the process of quenching steel from the metallurgical viewpoint is in order to clarify the quenching fluid characteristics required. The steel is first heated to such a temperature that austenite, a solid solution of carbon in gamma iron, is formed from the original steel constituents. When the austenite is cooled, several possible final products can result depending on the rate of cooling employed (actually depending on time in the temperature range in which the transformation takes place). Slow cooling produces pearlite, a relatively soft constituent. A faster rate of cooling can lead, in certain low alloy steels, to a structure called bainite, a somewhat harder constituent. When the rate of cooling is sufficiently rapid, the pearlite and bainite transformations can both be avoided and a new structure called martensite, the hardest and most brittle constituent, is formed. In the usual quenching process it is desired to achieve the martensite structure so that a closer control can be maintained on the properties of the steel during the subsequent tempering or heating stages.

The large temperature gradients produced in the steel during rapid cooling lead to large thermal stresses. An additional stress is created by the formation of martensite from austenite, since this transformation results in an increase in volume. Thus the magnitude of the temperature gradient and the rate of formation of martensite must be controlled to prevent the so-called "quench cracking." The martensite transformation occurs only during cooling, so that a reduced cooling rate in the martensite transformation temperature range reduces the rate of formation of martensite needles and thus reduces the chances of quench crack formation.

While the exact temperature ranges in which the various transformation products of austenite occur at high rates are dependent on the chemical compositions of a steel and on the grain size of the austenite, it is possible to give some approximate general values.

Table I

| Transformation of Austenite to— | Temperature for Most Rapid Formation, F. | |
|---|---|---|
| | Isothermal Transformation (Approx.) | During Quenching (Approx.) |
| Pearlite | 950 to 1,150 | 800 to 900. |
| Bainite in steels where it forms in shorter time than does pearlite. | 750 to 900 | 600 to 750. |
| Martensite | Does not form except during cooling. | Start 400 to 750 90% complete 200 to 650. The lower halves of these ranges apply to the steels that are normally oil-hardening. |

It is now possible to define the cooling characteristics desired in an oil-base type quenching fluid for use with the oil-hardening grades of steel (as opposed to water-hardening and air-hardening grades). This fluid should have the highest attainable cooling rates in the temperature range 1600 to 500° F. and should revert to slow cooling below about 500° F.

For a given part made of a given steel the hardness at any point is determined by the time-temperature history of the point during quenching. However, the quenching fluid can only affect conditions at the metal surface. This makes possible the evaluation of quenching oils by determining the time-temperature relationship in the quenching of a small mass having a high surface to volume ratio. The magnitude of the time interval required for the thermocouple bead to cool from 1600° F. to 500° F. is, therefore, a sound index of the quenching ability of the quenching fluid.

Other time indexes may be obtained by quenching from a different initial temperature to the same or a different final temperature. This is a particularly advantageous arrangement when the quenching oil is to be tailored to fit a specific steel. Complete information can be obtained on any fluid by a series of quenches from a particular quench temperature to several end temperatures. For example, the data in Table II below were obtained on a straight run quenching oil, a superfast quenching oil, and water.

Table II

| | 1,600° F., sec. | 1,000° F., sec. | 800° F., sec. | 600° F., sec. | 500° F., sec. |
|---|---|---|---|---|---|
| Mineral Oil | 0 | 3.2 | 3.8 | 4.9 | 6.4 |
| Superfast Quenching Oil | 0 | 2.0 | 2.3 | 2.9 | 3.2 |
| Water (80° F.) | 0 | 1.0 | 1.2 | 1.4 | 1.6 |

From these data a graphic record of the oil's performance and an instantaneous cooling rate for any given temperature can be obtained.

Referring to Figure 1, in particular, the double-pole double-throw switch 17 shown in the "off" position is manually operated to apply power to the heater windings 11a of the furnace 11. The bead 10a of the thermocouple 10 rises in temperature and the thermo-voltage thus generated by the thermocouple 10 is fed to coil 28 of the indicator 13 and the indicator needle 20 is deflected. When the indicator 13 indicates 1600° F., the switch 17 is thrown to disconnect the furnace heater windings 11a and make power available to the measuring circuit. The switch 17 is a safety device which prevents application of power to both the heater 11 and the measuring circuit leads 29 at the same time. This prolongs the heater life by disconnecting the heater 11 when it is not needed for heating the thermocouple 10.

In Figure 2, the guillotine slide 16 is released by moving the slide release 18 to the dotted position. In falling past the microswitch 21, the guillotine slide 16 closes the switch 21 to start the micro-timer 14 and energize D. C. power supply 25. The container 12 is positioned below the opening in furnace 11 and on the base 26a of the frame 26. The base, being provided with a guide ring 31, assures the container of being properly positioned to receive the falling thermocouple 10.

The thermocouple bead 10a is cooled by the oil bath 19 in container 12 and the thermo-voltage output of the thermocouple 10 decreases thereby causing the indicating needle 20 to travel down-scale until the second micro-switch 27 is closed. The current supplied by the D. C. source 25 flows through the contact locking coil 30, through the contacts of the second micro-switch 27 and through the relay 24. When the contacts of switch 27 touch, small current begins to flow wich assists the thermocouple voltage in building up contact pressure. This reduces contact resistance and results in rapid closing of the contacts. The closing of switch 27 energizes the relay 24 and the contacts 24a of relay 24 open and de-energize the micro-timer 14. The time interval indicated on the face of timer 14 is an index of the quenching ability over the range of temperatures covered.

The quench test thus being completed, the thermocouple 10 is removed from the support frame 26 and the bead 10a washed in a suitable solvent, such as carbon tetrachloride. This prevents smoking of the thermocouple 10 in the heater 11 on the next test cycle.

In Figures 3 and 4, the relative arrangement of the guillotine slide means 16, the thermocouple means 10, the furnace means 11 and the timer control means 21 have been illustrated. Figure 3 illustrates the initial position, i. e., the heating of the thermocouple bead 10a in the furnace 11, whereas Figure 4 illustrates the closing of micro-switch 21 during the time that the thermocouple bead 10a enters and is within the bath 19.

Since the guillotine slide 16 has considerable weight and is free falling, the shock absorber 32 may be provided to stop the fall thereof. This is shown in Figure 2 wherein the guillotine slide 16 is vertically movable within slide guide rails 33 which are fixed to the plates 34 and 35 of the instrument frame or housing 26. The guillotine slide release 18 is pivoted at 36 to the cross-member 37 and has a catch 38 which supports the cross-arm 39 of the slide 16 when it is desired to hold the thermocouple bead 10a within the furnace 11. The thermocouple 10 is supported at one end by the connector 15 which comprises the cold junction and is secured within the cross-head 40 of the sliding guillotine holder 16. Leads 41 and 42 join the connector 15 to pyrometer coil 28. The furnace 11 is supported by the back wall of the housing 26 so that the cylindrical interior is in substantial vertical alignment with the guide rails 33 which accommodate the legs of the inverted U-shaped slide 16.

Any tendency of the slide 16 to vibrate before it comes to rest on the shock absorber 32 supported by the stop bar 32a can be minimized by the curved leaf spring brakes 44. These brakes are fixed to the back wall of the housing 26 and have a curved contacting surface which holds the slide 16 in its rest position.

All of the components of the device can be carried by one man in a combination carrying and display case (not shown) and the instrument with its display timer can be set up on a table or bench for the evaluation of samples in the bottle or jar containers 12.

Although I have described my invention with reference to a particular embodiment thereof which has been set forth in considerable detail, it should be understood that this is by way of illustration only and that the invention is not necessarily limited thereto. For example, other means for heating the thermocouple, such as a torch or gas furnace, may be provided. Accordingly, alternative embodiments of the apparatus and modifications in the operating techniques will become apparent to those skilled in the art in view of my description and can be made without departing from the spirit of the described invention.

What I claim is:

1. An apparatus for evaluating the quenching power of a fluid which comprises the combination of a pyrometer means including a thermocouple, an elevated furnace means for heating said thermocouple, a sample container below said furnace means, a vertically sliding holder for initially supporting said thermocouple means within said furnace, a timer means, a switch means for initiating said timer, said switch means being actuated by the free fall of said vertically sliding holder, and said timer being stopped in response to a predesignated temperature sensed by said pyrometer means.

2. A compact portable quench oil tester comprising a thermocouple, a pyrometer means including said thermocouple, an electrical heater for raising the temperature of the hot junction of said thermocouple, an electric timer, a vertically slidable support for said thermocouple, a switch means for initiating said electric timer, said switch means being actuated by the free fall of said slidable support, and a second switch means controlled by said pyrometer and in turn stopping the electric timer in response to the thermocouple having cooled to a predesignated temperature.

3. A portable quenching oil tester comprising a frame means including upstanding side wall members, a base, a top member, and a rear wall, a pair of guide rails in alignment on opposite wall members, a hollow furnace supported by said rear wall member, a sample container guide ring on said base, a sliding member of the guillotine type supported in said guide rails, a latch means pivotally fixed to said top member and adapted to secure said sliding holder at a high point on said frame, and a thermocouple means carried by said sliding member and depending axially of said frame means to be positioned alternately within said furnace and within a container on said container guide means.

4. An apparatus for evaluating the quenching properties of a quench oil which comprises in combination a pyrometer means including a thermocouple assembly, a frame member, a cylindrical furnace supported by said frame member at a point spaced above the base thereof, a slide of generally inverted U-shaped configuration supporting said thermocouple assembly, a latch means for securing said slide in an elevated position on said frame whereby the bead of said thermocouple assembly is disposed within said furnace, a sample container below said furnace and in axial alignment therewith whereby said thermocouple may drop into said sample container, a container guide means on the base of said frame adapted to position said container below said furnace, an electrical timer means, a micro-switch means carried by said frame and actuated by said slide for energizing said timer, and a relay means overriding said micro-switch on said timer, said pyrometer means controlling said relay.

5. The apparatus of claim 4 wherein said pyrometer means includes a D. C. power supply and said micro-switch means energizes said D. C. supply.

6. The apparatus of claim 2 wherein said electric timer has a large display dial for visually indicating the elapsed time.

7. An apparatus for demonstrating the relative quenching power of various fluids which comprises in combination a frame means, a pair of guide rails vertically extending within said frame means, a slidable guillotine type holder between said rails within said frame member, a thermocouple means supported by said holder and extending vertically downward therefrom, a hollow electrical furnace within said frame member and disposed intermediate the top and bottom thereof, a latch for supporting said holder in an elevated position to place the hot junction of said thermocouple means in said furnace, a sample container means below said furnace and in alignment with the central axis thereof, an electric timer means adapted to indicate the length of time necessary to cool the hot junction of the thermocouple from a first temperature to a second temperature while immersed in a test sample, a first micro-switch actuated by said holder to initiate the timing interval of said timer, a current indicator means connected to said thermocouple, a second micro-switch actuated by said current indicator means to terminate the timing interval of said electric timer when the thermocouple has cooled to the desired designated second temperature.

8. An apparatus for use in evaluating the quenching properties of a quenching oil, said apparatus being of the type wherein a thermocouple is heated to a preselected temperature, the thermocouple is immersed in a sample of the oil under test during which time cooling of the thermocouple occurs, and the time necessary for the thermocouple to cool to a preselected level is indicated, the improvement which comprises an upstanding frame means having a top member, side walls and a base, a slide holder mounted between said side walls, a latch means on said top member for releasably securing said holder at a high point on said frame member, a hollow heater supported by said frame member intermediate said top member and said base, a thermocouple means supported by said holder so as to dispose the thermocouple axially within said furnace, a sample container means below said furnace on said base, and a micro-switch means in the path of the free fall of said holder, whereby the thermocouple is initially supported within the hollow furnace by said holder, and release of the latch permits the thermocouple to fall freely through the furnace and into said sample container and whereby simultaneously a timer means is actuated by said micro-switch and a current indicator means associated with said thermocouple, a second micro-switch controlled by said indicator means, said second micro-switch being adapted to stop the said timer means when the thermocouple has cooled to a preselected temperature.

References Cited in the file of this patent

UNITED STATES PATENTS

| 1,558,828 | Brace | Oct. 27, 1925 |
| 2,475,138 | Hood Jr. et al. | July 5, 1949 |
| 2,587,622 | Jaffe | Mar. 4, 1952 |

FOREIGN PATENTS

| 903,175 | France | Jan. 8, 1945 |